(12) United States Patent
de Haas

(10) Patent No.: US 11,588,662 B1
(45) Date of Patent: Feb. 21, 2023

(54) CONTROLLER AREA NETWORK TRANSCEIVER

(71) Applicant: NXP B.V., Eindhoven (NL)

(72) Inventor: Clemens Gerhardus Johannes de Haas, Ewijk (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/447,749

(22) Filed: Sep. 15, 2021

(51) Int. Cl.
*G06F 13/38* (2006.01)
*H04L 12/40* (2006.01)
*H04L 25/02* (2006.01)

(52) U.S. Cl.
CPC .. *H04L 12/40013* (2013.01); *H04L 12/40032* (2013.01); *H04L 25/026* (2013.01); *H04L 2012/40215* (2013.01); *H04L 2012/40273* (2013.01)

(58) Field of Classification Search
CPC .......... G06F 3/00; G06F 13/385; G06F 13/42; G06F 13/36; G06F 13/4022; H04L 49/102; H04L 12/40032; H04L 69/18; H04L 2012/40215; H04L 12/40169; H04L 25/0282; H04L 25/0272; H04L 25/0276
See application file for complete search history.

(56) References Cited

U.S. PATENT DOCUMENTS

| | | | | |
|---|---|---|---|---|
| 9,965,426 B2 * | 5/2018 | Pihet | ........................ | G05F 1/625 |
| 10,164,792 B2 * | 12/2018 | Hehemann | ............ | H04L 25/028 |
| 10,355,876 B2 * | 7/2019 | Kishigami | .............. | H04L 12/40 |
| 10,673,657 B2 * | 6/2020 | Frey | ..................... | G06F 13/4022 |
| 10,778,481 B1 * | 9/2020 | Glenn | ..................... | G06F 13/36 |
| 11,038,714 B2 | 6/2021 | Muth | | |
| 2004/0158781 A1 * | 8/2004 | Pihet | .................. | H04L 12/40013 |
| | | | | 714/712 |
| 2014/0156893 A1 * | 6/2014 | Monroe | .............. | G06F 13/4072 |
| | | | | 710/117 |
| 2014/0365693 A1 * | 12/2014 | Monroe | ..................... | G06F 3/00 |
| | | | | 710/105 |
| 2015/0222455 A1 * | 8/2015 | Ohtsuka | .............. | H04L 25/0272 |
| | | | | 375/219 |
| 2016/0204818 A1 * | 7/2016 | Kim | ......................... | H04B 1/40 |
| | | | | 375/219 |
| 2017/0070366 A1 * | 3/2017 | Hehemann | .......... | H04L 25/0286 |
| 2018/0041358 A1 * | 2/2018 | Kishigami | .............. | H04L 12/40 |

(Continued)

OTHER PUBLICATIONS

U.S. Appl. No. 17/450,191, filed Oct. 7, 2021.

*Primary Examiner* — Jung Liu

(57) ABSTRACT

A Controller Area Network (CAN) transceiver includes a receiver configured to determine a voltage differential signal from analog signalling received from a CAN bus and configured to provide a digital output signal at a receiver output to a CAN controller based on the voltage differential signal. The receiver includes arming circuitry configured to place the receiver in an armed or unarmed state based on the voltage differential signal, a first threshold corresponding to a first CAN protocol, and a second threshold corresponding to a second CAN protocol. When the receiver is in the unarmed state, a first digital signal indicative of activity on the CAN bus is provided based on a comparison between the voltage differential signal and the first threshold, and when in the armed state, the first digital signal is provided based on comparisons between the voltage differential signal and each of the first and the second thresholds.

17 Claims, 9 Drawing Sheets

(56) References Cited

U.S. PATENT DOCUMENTS

| | | | | |
|---|---|---|---|---|
| 2018/0343161 A1* | 11/2018 | Gehring | ............ | H04L 12/40032 |
| 2019/0132159 A1* | 5/2019 | Frey | ........................ | G06F 13/36 |
| 2019/0245872 A1* | 8/2019 | Shin | ........................ | H04L 12/40 |
| 2020/0097433 A1* | 3/2020 | Qi | ........................ | G06F 13/4068 |
| 2020/0169431 A1* | 5/2020 | Walker | .............. | H04L 12/40013 |
| 2022/0209982 A1* | 6/2022 | Gehring | ............ | H04L 12/40006 |

* cited by examiner

CONTROLLER AREA NETWORK TRANSCEIVER

FIELD

The present disclosure relates to controller area network (CAN) transceiver, a CAN node comprising a CAN controller in combination with said CAN transceiver and a method of operating a CAN transceiver.

BACKGROUND

In-vehicle network (IVN) buses, such as CAN (Controller Area Network), CAN FD (CAN with Flexible Data-Rate), LIN (Local Interconnect Network), FlexRay, Ethernet based network buses, and other types, can be used for communications within vehicles. For example, controller area network (CAN) bus is a message-based communications bus protocol that is often used within automobiles. It will be appreciated that CAN networks also have application outside of the field of automobiles. A CAN bus network may include multiple bus devices, so called nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The CAN bus protocol is used to enable communications between the various bus devices. The data link layer of the CAN protocol is standardized as International Standards Organization (ISO) 11898-1:2003. CAN Flexible Data-Rate or "CAN FD," which is an extension of the standardized CAN data link layer protocol and is meanwhile integrated into the ISO11898-1:2015 standard, can provide higher data rates. But the standardized CAN data link layer protocol is still in further process of being extended to provide even higher data rates. A further extension, referred to as CAN XL, with a new level scheme allowing even higher data rates is in the definition phase discussed under CiA610 (CAN in Automation) and is moving towards standardization in the form of either a further update of the existing ISO11898 standards or a new standard. However, it is of interest to allow backwards compatibility between all the CAN flavours, for example, CAN XL with CAN FD.

BRIEF DESCRIPTION OF THE DRAWINGS

One or more embodiments will now be described by way of example only with reference to the accompanying drawings in which.

DETAILED DESCRIPTION

Embodiments of CAN XL transceivers disclosed herein are designed to be backwards compatible with devices that use the CAN FD protocol. The backward compatibility is achieved through a control bit within the CAN FD protocol bit stream that forces existing CAN FD controllers into a protocol exception state, whenever a CAN XL frame is detected on the bus lines. The voltage level schemes for CAN XL and CAN FD comprise the voltages used for signalling on the wires of the CAN bus. The modification of the voltage level scheme used by CAN FD compared to CAN XL may be useful for achieving higher bus speeds with CAN XL. In one or more examples, the transceiver described herein may make it possible to run both protocols, CAN FD and CAN XL, interleaved on the same bus wires 105 despite the use of a different voltage level schemes. To help insure the CAN FD controllers are reliably kept in the protocol exception state even if other nodes are running the CAN XL protocol, the transceiver will signal to the CAN FD controller when a CAN XL differential voltage level scheme is detected on the bus. Reflections after a CAN or CAN FD dominant to recessive transition could be misinterpreted as a CAN XL differential voltage level scheme, but the embodiments of the CAN XL transceivers disclosed herein are designed to prevent this misinterpretation. Reflections will not result in glitches on the receive data output, thereby preventing an impact on signal integrity during CAN FD communication.

Figure 1:
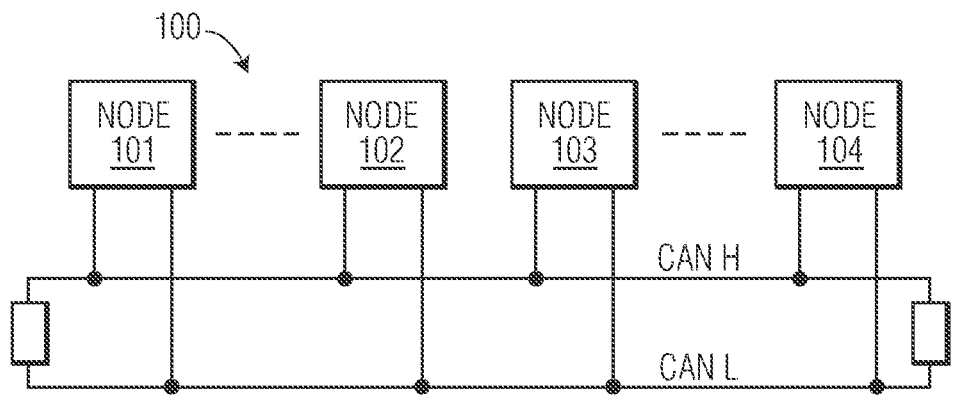
FIG. 1 shows an example embodiment of a plurality of CAN nodes connected to a common CAN bus.

As an example of a CAN network, FIG. 1 shows a CAN bus system 100 with a plurality of nodes or ECUs (Electronic Control Units) 101-104 connected to the same CAN bus wires 105 comprising a first CANH wire and a second CANL simultaneously. The nodes 101 and 102 comprise conventional CAN FD nodes that implement the CAN FD protocol. The nodes 103 and 104 comprise nodes that implement an extended version of the CAN protocol, such as the proposed CAN XL protocol. The CAN XL protocol is not known to the nodes 101, 102 that implement the CAN FD protocol.

Figure 2:
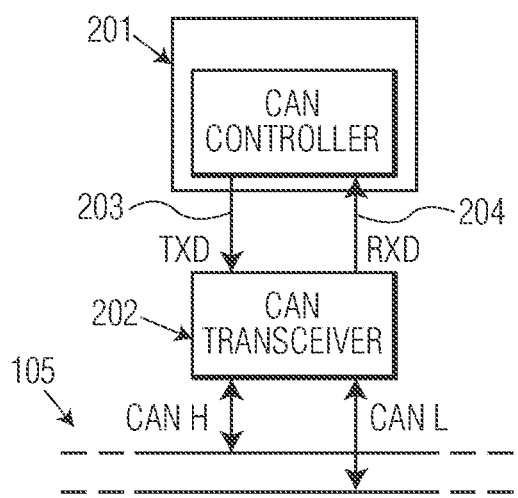
FIG. 2 shows an example CAN node comprising a CAN controller coupled with a CAN transceiver, the CAN transceiver providing the coupling to the CAN bus.

FIG. 2 shows an example of one of the nodes 101-104 in more detail. A node mainly comprises a CAN controller 201, such as a microcontroller, that implements the CAN FD or CAN XL protocol such as by using an embedded CAN FD or CAN XL protocol controller. The controller 201 is connected to the CAN bus 105 by a CAN transceiver 202. The CAN controller 201 is connected to the CAN transceiver 202 through two interface connections called TXD (Transmit Data) pin 203 and RXD (Receive Data) pin 204. The controller may therefore have a transmit output that couples with a transmit input of the transceiver. Likewise, the transceiver may have a receive output that couples with a receive input of the controller. The transceiver 202 is used to convert transmit data comprising a digital bit stream on TXD pin 203 into analogue signalling on the bus wires 105. The transceiver 202 may also be used to convert analogue signalling from the bus 105 into receive data comprising a digital output signal or bit stream that is provided to the RXD pin 204.

The introduction of a new CAN protocol variant can be an issue if such introduction is not backwards compatible/interoperable. Both CAN transceivers and CAN controllers at each node in a network may experience data inaccuracies when transitioning from one CAN protocol variant to the next. Therefore, it may be important to ensure compatibility and, optionally, interoperability between nodes using CAN FD and CAN XL.

As mentioned, the CAN FD protocol has a function called "protocol exception state", which places a CAN FD controller in a waiting loop until the bus 105 becomes free again. Within this state a CAN FD controller tolerates bus signalling that is non-compliant with the CAN FD protocol, without creating any errors. To stay within the protocol exception state, there must be dominant signals (i.e. a logic 0 signal)/dominant level changes on the receive input from the receive connection 204 towards the CAN FD controller in order to signal to the CAN FD controller that there is still activity on the bus. To leave the protocol exception state, the CAN FD controller looks for a period of recessive signals (i.e., a contiguous logic 1 signal over several bits) on the RXD pin 204 whereupon the bus 105 is regarded to be free again and the "not known" protocol has finished.

CAN XL makes use of the Protocol Exception State of CAN FD and is intended to keep the CAN FD controllers in the exception state until the CAN XL frame is finished. Therefore, it is assumed, that the CAN XL protocol creates the required dominant signal or dominant signal changes based on the CAN XL traffic at the RXD pin 204 so that the CAN FD controllers remain in the protocol exception state until the CAN XL traffic is complete.

The proposed CAN XL physical layer however specifies modifications in the voltage level scheme of the signalling of bits on the bus 105 wires in order to provide the desired bus speed performance. A result of this voltage level scheme is that there are potentially no dominant signal edges on the RXD pin 204 towards any CAN FD controllers that may be part of the network 100 because voltage tolerances of the voltage levels used on the bus 105 may result in dominant signalling not being detected by the CAN FD compliant CAN transceivers. In essence it may be that the CAN XL signalling uses voltage levels that are so low in amplitude that the CAN receiver with the classical receiver thresholds (as used in the CAN FD module) does not recognize any bus 105 activity and the RXD pin 204 provided to the CAN FD controller may appear to be continually recessive. As a consequence, the CAN FD controller would leave their protocol exception state too early and create errors, which may interfere with traffic on the bus 105.

A similar problem occurs, if a node is powered-up the first time, while other nodes in the system are already communicating with CAN XL protocol and levels. A node, which is powered up may start in the protocol exception state by default and then wait for the expiration of this exception state. It may be important that a node reliably recognizes the communication in CAN XL level scheme in order to stay in this exception state, until the bus is free again.

One or more examples of the present disclosure may be configured to reliably keep the CAN FD nodes in their protocol exception state during signalling on the bus 105 defined in the proposed CAN XL physical layer. In one or more examples, nodes having CAN controllers that implement CAN FD and CAN XL protocol can be mixed on one and the same bus 105 without any restrictions. This may enable interleaved CAN FD and CAN XL communication on the same medium and may allow for integration of nodes into the network 100 after they are powered-up.

For bus speed reasons the CAN XL physical layer switches the output and input behaviour, i.e. the voltage level scheme and, optionally, the signalling rate, depending on the phase of the protocol. At the beginning of a CAN XL frame, the CAN FD or ISO 11898-2:2016 level scheme is used, which is also used for CAN FD nodes. This guarantees the interoperability/backwards compatibility of CAN FD with CAN XL at the beginning of the frames. This voltage level scheme is used for determining the node 101-104 that gains bus access through the known CAN Arbitration method.

After passing the decision point, which protocol is used (CAN FD or CAN XL) is signalled and the Physical Layer of CAN XL is changed to the CAN XL voltage level scheme or remains in the CAN FD voltage level scheme. In the case a CAN XL node 103, 104 has won the bus access, the CAN XL voltage level scheme may be used to provide stronger output drive with different output and input levels. This may be required to drive the bus with maximum physical speed. The old, CAN FD voltage level scheme was not optimized for speed and as such may not be suitable for very high bus speeds, which is the main desired feature of CAN XL.

If we consider a CAN XL compliant controller coupled with a CAN transceiver in accordance with an embodiment herein, the new CAN XL Physical Layer may be configured to switch between the two voltage level schemes through a control mechanism between the CAN XL Controller (or protocol controller thereof) and the CAN Transceiver. The transceiver is usually a very simple device not knowing the protocol to be transported. So, the CAN XL controller may be configured to provide this switching information. For the present disclosure it is not of relevance how this control is done. It can be easily understood, that an old CAN FD controller cannot deliver this switching signal, because it was developed at a time when CAN XL was not known. As such, a module with a CAN FD controller in combination with a CAN transceiver in accordance with an embodiment herein cannot be switched to the CAN XL voltage level scheme while other nodes are using the CAN XL protocol.

One or more examples described herein propose to have a detection mechanism inside the CAN Transceiver, which may autonomously execute the switching between the two voltage level schemes based on observation of the voltage levels on the bus. If there is CAN XL traffic on the bus lines, the exemplary CAN transceiver 202 may be configured to forward an according level to the RXD pin 204 of the connected CAN FD controller 201 keeping it reliably in the protocol exception state until the CAN XL frame ends.

In one or more examples, the CAN transceiver described herein may be used in all nodes regardless of the CAN controller (or protocol controller thereof) to which it is coupled. Accordingly, the CAN transceiver described herein in the examples that follow may be coupled with a CAN FD compliant controller (e.g. one that is not capable of communication under the CAN XL protocol) or a CAN XL compliant controller (e.g. one that is capable of communication under CAN XL and CAN FD for at least the arbitration phase). If this is the case, both protocols can be used simultaneously on the same bus 105 with interleaved message formats. "Old" nodes with CAN FD controllers may only need to be upgraded with a new CAN transceiver. This is a minor change and can be done when the CAN transceiver as described herein is available. It may take a longer time until all controllers 201 with the CAN protocol are upgraded to CAN XL controllers.

The CAN XL protocol is defined to be a superset of CAN FD and the classical CAN protocol. As such, a CAN XL module may as well use the CAN FD protocol or even the classical CAN protocol depending on configuration/programming of the CAN XL controller.

CAN FD and CAN XL both use the identical bus access mechanism and bus voltage level scheme through the so-called bit wise arbitration as defined for CAN in ISO11898. As such, both CAN variants are interoperable and backwards compatible. As long as the CAN FD node is winning the bus access through a higher priority in the identifier, the CAN FD protocol continues through the rest of the frame with the known bus voltage level scheme as used in CAN and CAN FD. A CAN XL controller is capable per definition of the CAN XL Standard to understand the CAN FD signalling.

Figure 3:
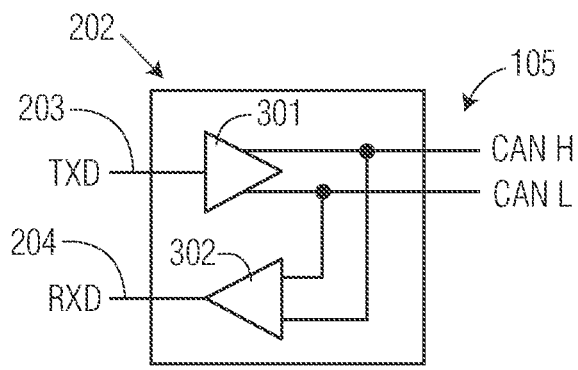
FIG. 3 shows an example CAN transceiver having a transmitter arrangement and a receiver arrangement.

FIG. 3 shows a general arrangement of a CAN transceiver 202 including the transmit input for coupling to the TXD pin 203 and the receive output for coupling to the RXD pin 204. The transceiver 202 comprises a transmitter arrangement 301 for receiving digital transmit data from the transmit input and for coupling to the bus 105 to provide differential signalling based on the transmit data to the two wires of the bus 105. The transceiver 202 comprises a receiver arrangement 302 for receiving signalling from the bus 105, and to provide a digital output signal to the receive output based on a differential signal received from the bus 105.

Figure 4:
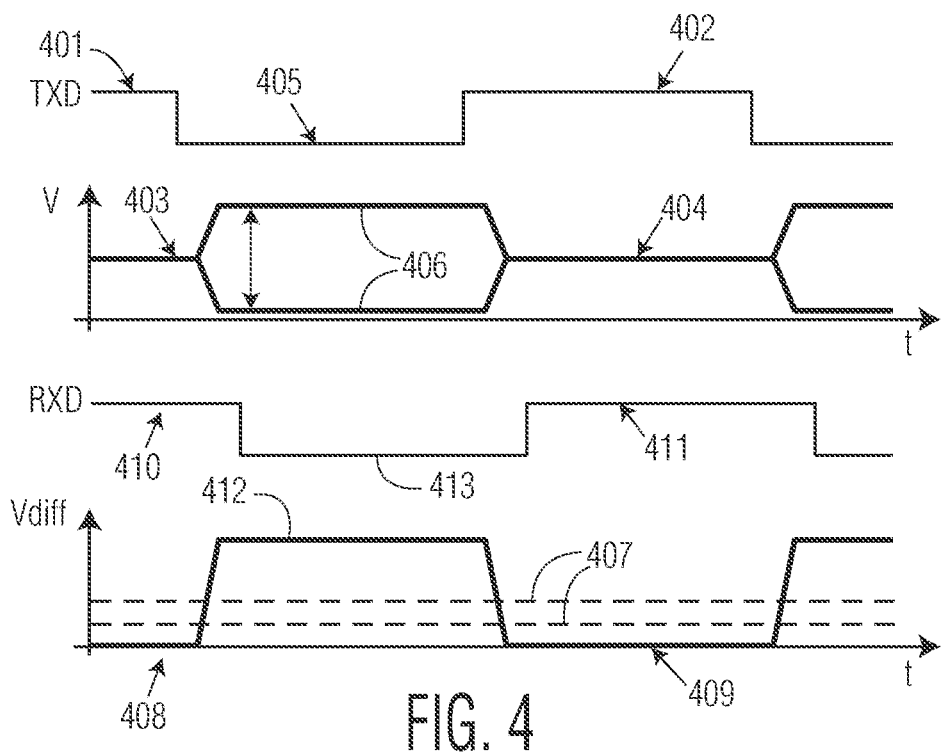
FIG. 4 shows an example timing diagram illustrating a transmit signal and the corresponding signalling applied to the CAN bus, and a received digital output signal derived from a differential signal obtained from signalling on the CAN bus, according to the CAN or CAN FD protocol.

A transceiver according to the state of the art for CAN systems may use a voltage level scheme as defined in the ISO 11898-2:2016 standard. FIG. 4 illustrates an example timing diagram showing such a voltage level scheme. Logic high bits, also known as recessive bits, in the transmit data at 401, 402 are represented with 0V differential at 403, 404, while logic low bits, also known as dominant bits, at 405 are represented with a positive differential voltage between +1.5V to +3V, shown by the different voltage levels at the CANH wire and CANL wire of the bus at 406. As such the transmitter arrangement 301 is converting a logical "1" (high level, also known as recessive) to a 0V differential output voltage and a logical "0" (low level, also known as dominant) into a positive differential voltage between +1.5V up to +3V.

The receiver arrangement 302 connected to the RXD pin 204 is converting the differential voltage back into logical levels. Again, in accordance with the ISO 11898-2:2016 standard the receiver arrangement 302 switches with a threshold voltage or threshold voltage range 407 of +0.5V up to +0.9V differential between the logical states. In case the differential bus voltage (Vdiff) is below +0.5V as at 408 and 409, the receive arrangement outputs "1" (high level, also known as recessive) as shown at 410 and 411. If the bus voltage is higher than +0.9V as at 412, the receive arrangement outputs "0" (low level, also known as dominant), as at 413.

One of the aims for CAN XL is that the communication speed shall be improved towards the maximum that is physically possible. The voltage level scheme as defined in the ISO11898-2:2016 is not optimized for that purpose due to several reasons.

First, the arbitration mechanism needs to make sure that the bus becomes relatively high-ohmic (this is, why that state is called "recessive") for the logical state "1" (high). This high ohmic state can be overridden by another sender with a low-ohmic "0" (this is, why it is called "dominant"). Second, this same mechanism is used through all the CAN FD frames to signal a detected error on the bus lines. Any node may override a sender at any time during the recessive bit phases and with that, stop a transmission on the fly.

"High ohmic" driven bits are rather slow and have other draw backs in practice. Long physical bus cables with multiple branches can create a lot of reflections and may corrupt the high-ohmic bits.

The CAN XL voltage level scheme may be more optimized for maximum signal performance on the bus 105. Since the Arbitration phase used for determining bus access stays the same in CAN XL (for backwards compatibility), a CAN XL Transceiver may use the new voltage level scheme only after the Arbitration phase is complete and the CAN XL controller has won access to the bus. At that moment, the CAN XL Transceiver may switch to the new voltage level scheme and boost the speed on the bus 105. Intentionally, the CAN XL protocol may not allow any other node to override data bits. The high ohmic output behaviour could be avoided and all bit levels driven with more optimum strength.

Figure 5:
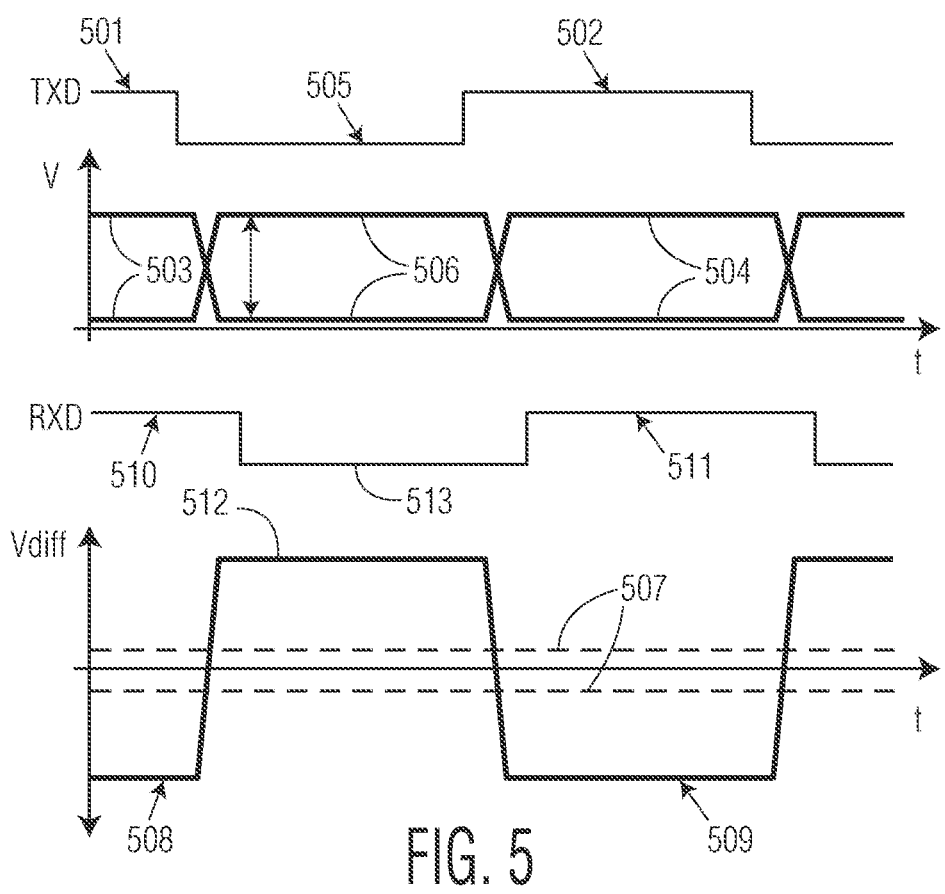
FIG. 5 shows an example timing diagram illustrating a transmit signal and the corresponding signalling applied to the CAN bus, and a received digital output signal derived from a differential signal obtained from signalling on the CAN bus, according to the proposed CAN XL protocol.

FIG. 5 shows an example timing diagram showing a proposed CAN XL voltage level scheme. In the voltage level scheme of CAN FD, bits are described as recessive or dominant. However, in the proposed scheme there are no recessive bits. Logic high bits in the transmit data at 501, 502 are represented with a negative differential signal (i.e. equal to CANH-CANL), shown by the different voltage levels at the CANH wire and CANL wire of the bus at 503, 504. Logic low bits at 505 are represented with a positive differential voltage, shown by the different voltage levels at the CANH wire and CANL wire of the bus at 506. As such the transmitter arrangement 301 is converting a logical "1" (high level) to a negative differential output voltage between −0.6V and −1V and a logical "0" (low level) into a positive differential voltage between +0.6V and +1V.

The receiver arrangement 302 connected to the RXD pin 204 is converting the differential voltage back into a digital output signal with logical levels. The receiver arrangement switches with a threshold voltage or threshold voltage range 507 of −0.1V to +0.1V differential between the logical states. In case the differential bus voltage (Vdiff) is below −0.1V as at 508 and 509, the receive arrangement outputs "1" (high level) as shown at 510 and 511. If the bus voltage is higher than +0.1V as at 512, the receive arrangement outputs "0" (low level), as at 513.

For CAN XL Transceivers a mechanism is defined which triggers the switching between the voltage level schemes shown in FIGS. 4 and 5. This mechanism changes the Transmitter behavior from the known ISO11898-2:2016 level scheme towards the new proposed one for CAN XL and vice versa. The same mechanism may be used for switching the receiver thresholds between the voltage level schemes. The mode switching mechanism is defined in the CAN XL standard.

Figure 6:
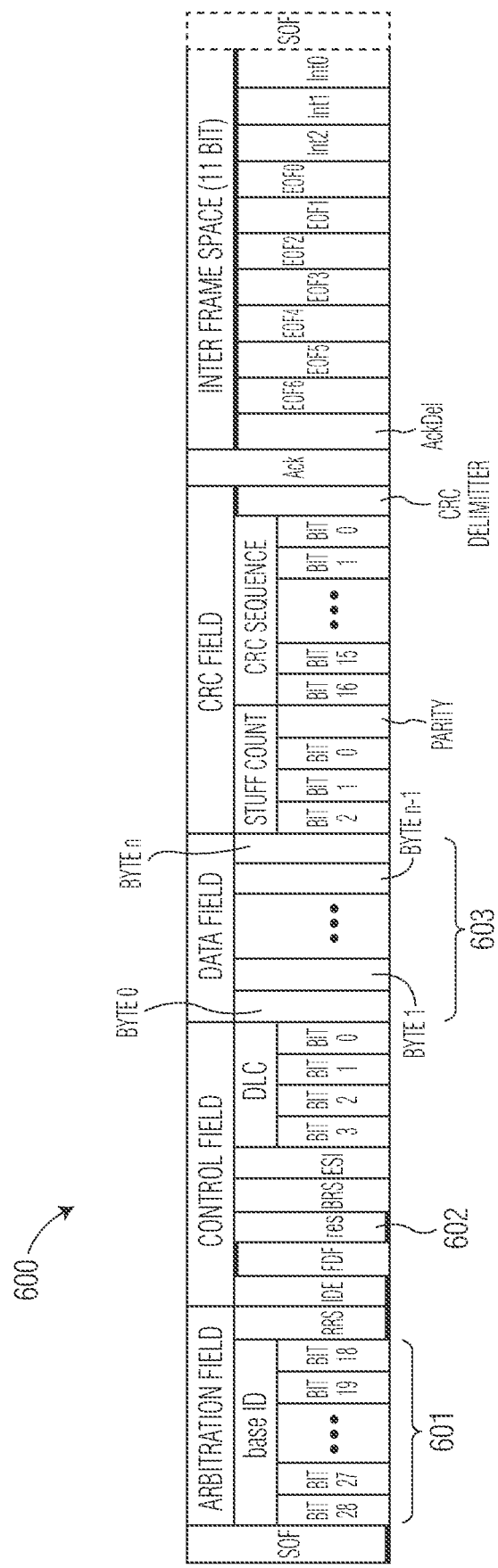
FIG. 6 shows an example CAN frame format illustrating a bit position in which the upcoming presence of non-CAN or non-CAN FD signalling, such as CAN XL, on the CAN bus can be indicated.

FIG. 6 illustrates an example CAN FD frame format 600 (here the CAN FD Base Frame Format with 11-bit Identifier). Following a series of bits 601 used for the arbitration process there comprises a reserved bit 602 for signalling the use of the protocol exception state for any CAN FD controller on the network 100 or, for nodes that support CAN XL, the reserved bit may signal the upcoming use of the CAN XL protocol. The data field 603 may therefore contain CAN FD compliant signalling if the bit 602 is dominant and the data field 603 may contain CAN XL compliant signalling if the bit 602 is recessive. Thus, the bit 602 may be considered to be where the transition from the CAN FD protocol towards the CAN XL protocol takes place. If this reserved bit is dominant (logic 0) on the bus lines, this is a CAN FD frame and all following bits follow the CAN FD protocol rules as shown in FIG. 6. If this reserved bit is recessive on the bus (logic 1), all following bits may follow the CAN XL protocol rules (not shown in FIG. 6).

Figure 7:
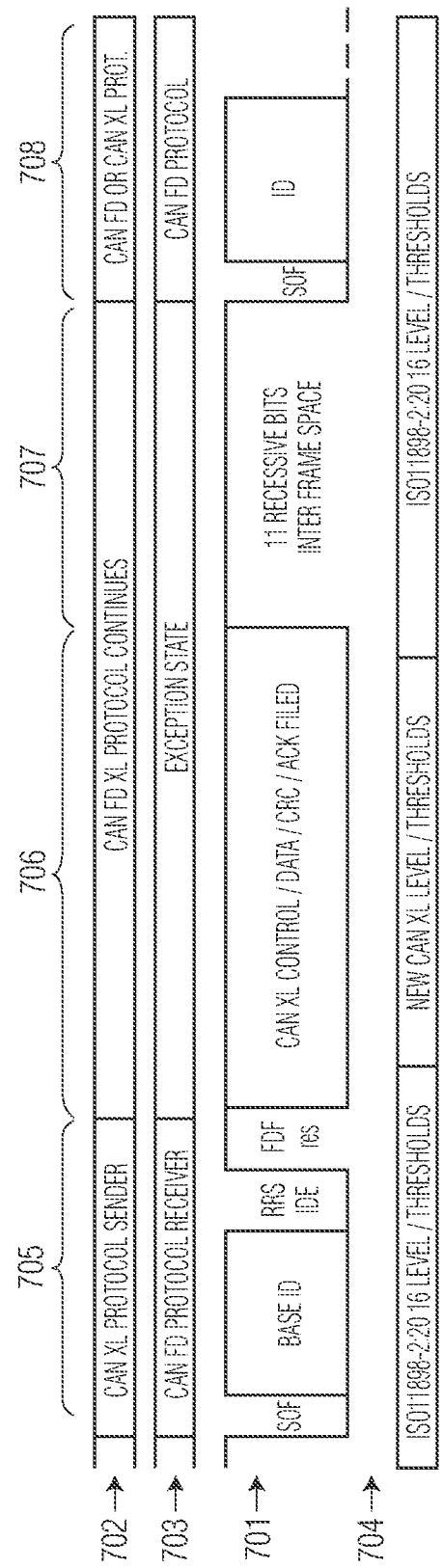
FIG. 7 shows an example timing diagram in which non-CAN or non-CAN FD signalling, such as CAN XL signalling, is provided while a CAN FD node is in a protocol exception state.

FIG. 7 shows an example timing diagram illustrating the bits received 701 on the bus 105, the state of a CAN XL node at 702 in response to said bits, the state of a CAN FD node at 703 in response to said bits and the voltage level scheme used in the bus at 704. The period 705 comprises the arbitration phase in which the CAN XL node, in this example, wins arbitration. The reserved bit 602 is placed in the logic 1 state by the winning node and this is transmitted on the bus. Accordingly, the CAN XL node is shown as continuing the CAN XL protocol and, during period 706, the CAN FD node receives the recessive logic 1 reserved bit 602 and places itself in the protocol exception state. Once a CAN FD controller discovers this reserved bit to be recessive, it enters the "Protocol Exception State" ignoring all traffic on the bus from now on. The CAN FD controller will stay in this state as long as it does not see a period of predetermined length on the bus and respectively at the receive input from the RXD pin 204 with a contiguous recessive state.

So, normally, as long as the CAN XL node is still sending signalling to the bus, the CAN FD node(s) remain in the Protocol Exception State because the CAN FD nodes see the bus activity includes dominant signalling caused by the CAN XL signalling on the bus 105.

Similar to all CAN protocol flavours like CAN FD or classical CAN, the proposed CAN XL frames also end with 11 consecutive bit times in a recessive logic 1 state until a next frame may start. For these 11 consecutive recessive bit times, there are no bit transitions anymore on the bus and with that on the RXD pin 204 of the CAN FD controllers in the CAN FD modules. These 11 recessive bits defined in CAN XL also serve to provide the predetermined time of contiguous recessive signalling required to signal that the CAN FD controller(s) can leave the Protocol Exception State. So, after 11 bit times of silence in recessive state, all nodes are active again and a new negotiation period on the bus 105 may start through the next Arbitration Phase 708. Considering the voltage level scheme 704, the CAN FD voltage level scheme is used during the arbitration phase 705, the predetermined time of recessive signalling to leave the protocol exception state 707 and the next arbitration phase 708. During the data phase 706 in which a CAN XL controller has won arbitration, the CAN XL voltage level scheme is used. The transition back to ISO11898-2:2016 level scheme happens at some non-relevant bit position at the end of the CAN XL frame but before the predetermined time period, also known as the Inter Frame Space 707, starts.

Thus, provided that dominant signalling is visible to the CAN FD controllers during the data phase 706, it can be understood that it is possible to mix CAN FD with CAN XL nodes in one and the same bus system. This mechanism only works if the CAN FD node in Protocol Except State can observe the bus activity by the RXD pin 204 while the CAN XL node is transmitting bits on the bus.

Unfortunately, the CAN XL voltage level scheme makes use of voltage levels on the bus that cannot be guaranteed to be seen by all CAN FD transceivers. Accordingly, the RXD pin 204 at CAN FD nodes may not see activity on the bus when there is CAN XL signalling on the bus. It might be under some conditions, that the bus levels in the CAN XL data phase 706 are lower than the maximum receiver threshold of +0.9V used by CAN transceivers to differentiate between logic 1 and logic 0 signalling in the ISO 11898-2:2016 standard. In particular, the minimum voltage of a CAN XL data bits may be just +0.6V, less than the maximum receiver threshold of +0.9V and as such are not necessarily visible anymore on the RXD pin 204 of the CAN FD compliant nodes. Instead, a controller would see a permanent recessive state (logical "1" on RXD pin 204) and after 11 consecutive bit times would leave the protocol exception state. The consequence would be that the CAN FD nodes regard the bus to be free and would start transmission while in the background the CAN XL nodes are still using the bus with the other, CAN XL voltage level scheme.

Figure 8:
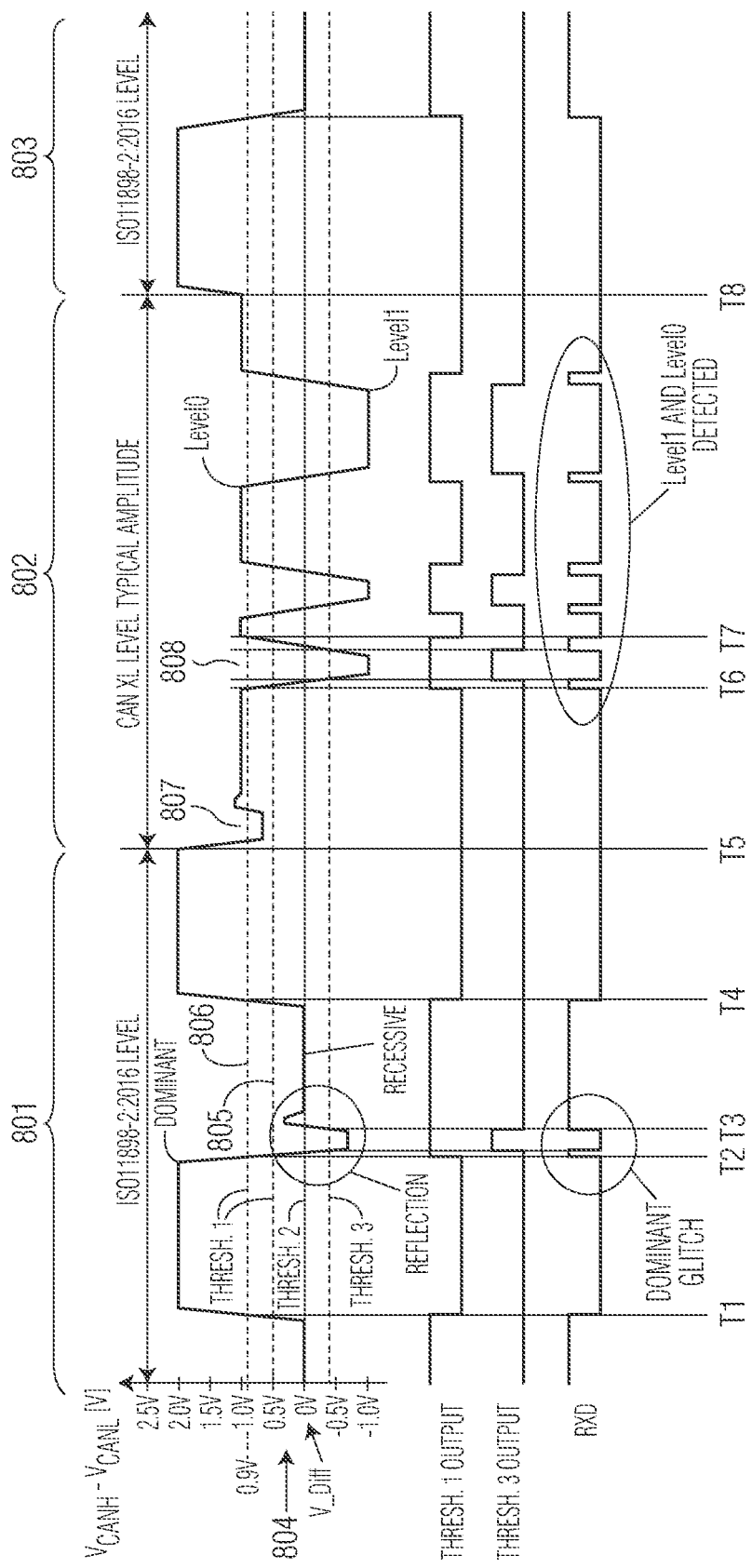
FIG. 8 shows a first example of a differential signal obtained from CAN bus signalling according to CAN FD which switches to CAN XL and back to CAN FD.

FIG. 8 shows a first example of a differential signal obtained from CAN bus signalling according to CAN FD during time period 801, which switches to CAN XL during time period 802, and back to CAN FD during time period 803. As mentioned, the thresholds used by a CAN FD transceiver to differentiate between logic 1 and logic 0 from the differential signal 804 (CANH-CANL) obtained from the signalling on the CAN bus is between +0.6V and +0.9V shown as threshold 1 lines 805 and 806. In time periods 801 and 803, the high and low levels are clearly above and below these thresholds and therefore the distinction between a logic 1 and a logic 0 is clear. However, in case of the CAN XL bus amplitudes in period 802, the differential signal 804 has a voltage that is near the threshold 806 and threshold 805. Thus, the CAN XL signalling may not exceed the lower threshold 1 line 805 or upper threshold 1 line 806, such as due to production spread, temperature conditions or cable losses. In the CAN XL standard (CIA 610-3), when the differential signal 804 (CANH-CANL) is below −0.45V (Thresh 3) the RXD pin 204 is to be driven to a dominant state (logical "0" on RXD pin 204) to signal to the CAN FD controller 201 (FIG. 2) that CAN XL signals are present on the bus.

Dominant signal glitches can occur when reflections cause the differential signal to go below a third threshold when the termination scheme is not optimum, as shown by the circled portion 806 between time T2 and time T3. Since the RXD signal is driven dominant during the negative reflection, the maximum baud rate during the data phase (using the ISO11898-2:2016 level scheme as well in the data phase of a CAN XL frame) may be limited and lower than desired. To block driving the RXD signal dominant in case of negative differential bus voltage below the third threshold reflections during CAN FD traffic need to be discriminated from high bit rates during CAN XL fast traffic. One solution is to use a filter, however, suppressing reflections requires a long filter time that can limit the maximum bit rate for CAN XL because the fast bits may then not be detected anymore.

A second drawback shown in FIG. 8 occurs between time T6 and time T8 when there is level0/level1 traffic on the bus with the level0 voltage level above threshold 1. This can result in short high pulses in the RXD signal ("Level1 and Level0 detected") because a comparator 1206 for threshold 1 (FIG. 12) will drive the RXD signal high at a falling edge on the bus, and a comparator 1208 for threshold 3 (FIG. 12) will shortly after drive the RXD signal low again. Similar behavior will be exhibited at a rising edge on the bus. From an emission point of view, the short pulses are not favorable, because they have a repetition rate double the frequency of the comparator for threshold 1.

Thus, the voltage thresholds used by a CAN FD transceiver may be problematic. It should be understood that a CAN FD controller has no means to switch or change the threshold used by the connected transceiver towards a different receiver threshold. Such a function was not foreseen at the development of CAN FD. So, the CAN FD node leaves the transceiver within the ISO119898-2:2016 level scheme and receiver thresholds are +0.5V to +0.9V.

FIG. 8 assumes the transition from ISO levels to CAN XL levels within a dominant bit state and the transition back during a recessive bit state.

Figure 9:
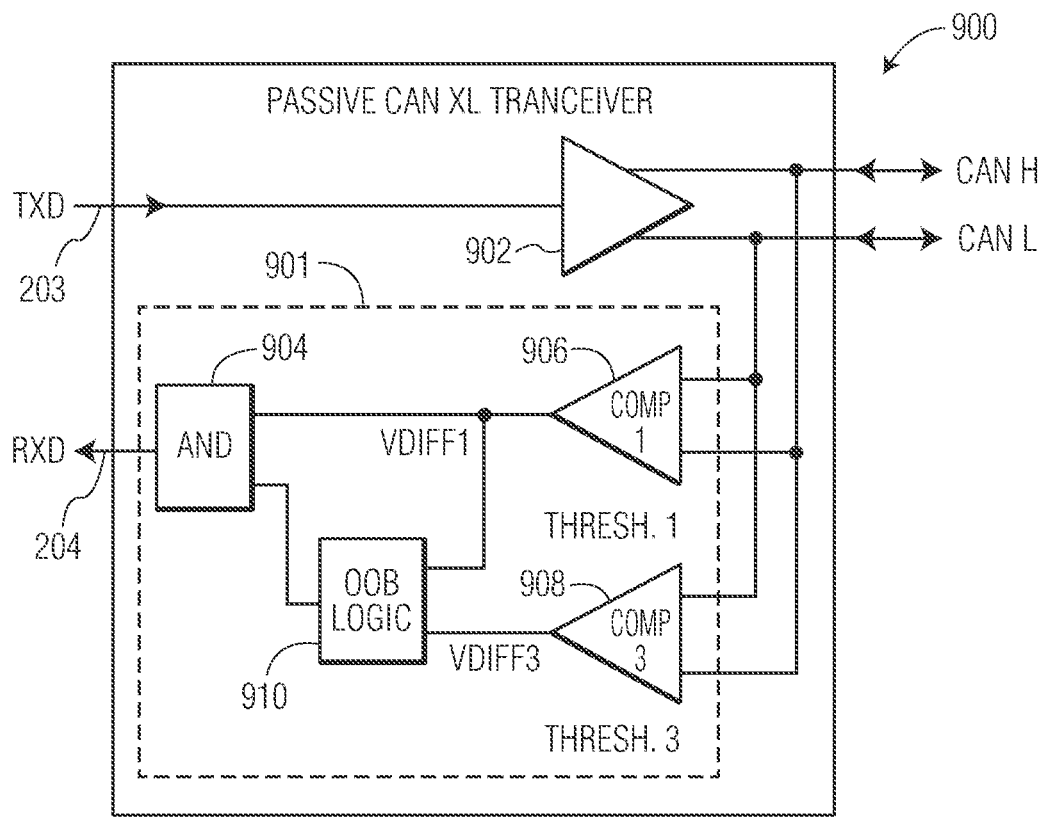
FIG. 9 shows an example of a passive CAN XL transceiver configured with the out-of-bounds logic of FIG. 10.

FIG. 9 shows an example embodiment of passive CAN XL transceiver 900 for coupling to a CAN FD controller 201 (FIG. 1). Passive CAN XL transceiver 900 includes transmitter 902, and receiver arrangement 901 that includes comparators 906, 908, OOB logic 910, and AND logic gate 904. The term "passive CAN XL transceiver" can refer to a transceiver that operates with the CAN FD protocol and voltage thresholds, and can detect when data that is not in the CAN FD protocol is present on the bus. Passive CAN XL transceiver 900 may not be able to decipher data in other protocols, such as the CAN XL protocol, but will at least recognize when the bus is occupied. The receiver arrangement 901 is configured to provide a digital output signal to the receive output 204 based on the differential signals (CANH/CANL). In one or more examples, the transceiver 900 further comprises a transmit input 203 for coupling to CAN controller 201 and to receive a single-ended transmit signal therefrom. Passive CAN XL transceiver 900 further comprises a transmitter arrangement 902 coupled to the transmit input 203 to receive the transmit signal and is configured for coupling to the CAN bus 105 (FIG. 1). The transmitter arrangement 902 is configured to provide differential analog signals (CANH/CANL) based on the transmit signal.

OOB logic 910 and AND gate 904 can be used to avoid problems due to reflections in CAN FD signals. Transmitter 902 converts single-ended transmit signals to differential signals CANL and CANH. A first comparator 906 may be configured to determine a digital output signal using the CAN FD voltage level scheme with a first threshold voltage of +0.5V to +0.9V. A second comparator 908 may be configured to determine a digital output signal using the CAN XL voltage level scheme with a threshold voltage of −0.25V to −0.45V.

For CAN XL systems a certain range of possible baud rates is defined, which are relevant for a proper detection of potential CAN XL traffic inside transceiver 900. The CAN XL arbitration speed with ISO11898-2:2016 level scheme may go up to 1 Mbps which corresponds to 1 μs (μs also written as us herein) of minimum bit time while the data phase may go up to 10 Mbps which corresponds to 100 ns of minimum bit time. It will be appreciated that as the proposed protocol is established, the data phase may go up to different or high rates, such as 12.5 Mbps or other values and accordingly the minimum bit time for the data phase is subject to change.

It can now be derived, that the potentially shortest time out of the protocol exception state in CAN FD occurs at the highest potential Arbitration baud rate. As such, the 11 recessive bit times terminating the Protocol Exception State are expired after 11×1 μs=11 μs earliest. For lower used baud rates during Arbitration phase, the protocol exception state is accordingly longer. This translates to a maximum available time to detect and signal CAN XL traffic on the RXD pin 204 to be 11μs or less.

The detection of CAN XL traffic needs to assume the fastest possible data rate during CAN XL communication, which may be 10 Mbs resulting in minimum 100 ns or longer pulses/phases on the bus. In case CAN XL would be used with higher baud rates, this time may be shortened accordingly. Multiple consecutive bits with the same bit level can extend the pulse lengths and are not critical for detection. Most critical is the shortest time to be detected.

It is proposed to provide a transceiver (e.g., a CAN transceiver) that may be used with a CAN controller 201 operating in accordance with the CAN FD protocol and optionally, be used with a CAN controller operating in accordance with the CAN XL protocol. It will be appreciated that a CAN controller operating in accordance with the CAN XL protocol may also operate in accordance with the CAN FD protocol given that at least the arbitration phases are the same. In an effort to avoid dominant signal glitches from reflections, and short pulses due to level0/level1 detection, two criteria can be used in out-of-boundary (OOB) logic within CAN FD and CAN XL transceivers. The first criteria can include waiting a specified amount of time after a switch from dominant to recessive state occurs with CAN FD before detecting activity on the CAN bus, as further described for FIG. 9. The second criteria can include waiting a specified amount of time after switching from level1 to level0, and vice versa, before detecting activity on the CAN bus to avoid the short pulses on the RXD signal when using CAN XL, as further described for FIG. 12.

TXD pin 203 is coupled to an input to single-ended to differential converter 902, which produces the differential CANH/CANL signals. Comparator 906 includes a first input coupled to the CANL signal and a second input coupled to the CANH signal. An output of comparator 906 is a digital signal that indicates whether differential signals CANL and CANH are between a first threshold, for example, between 0.5V and 0.9V, or other selected voltages. The output of comparator 906 is provided as an input to AND logic gate 904 and an input to OOB logic 910. Comparator 908 includes a first input coupled to the CANL signal and a second input coupled to the CANH signal. An output of comparator 908 is a digital signal that indicates whether differential signals CANL and CANH are below a third threshold, for example, below −0.45V or other selected voltage. The output of comparator 908 is provided as an input to OOB logic 910.

Figure 10:
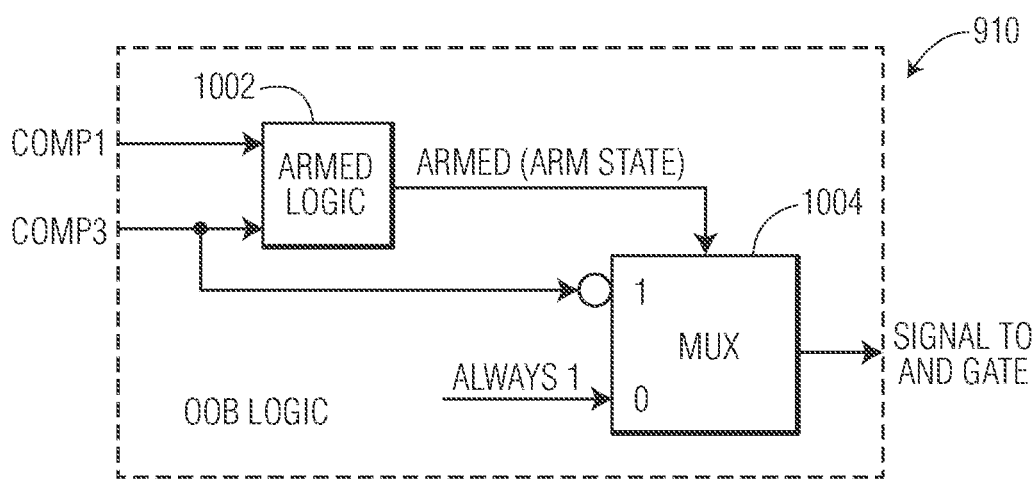
FIG. 10 shows an example of out-of-bounds (OOB) logic that can be used in the transceivers of FIGS. 9 and 12.
Figure 12:
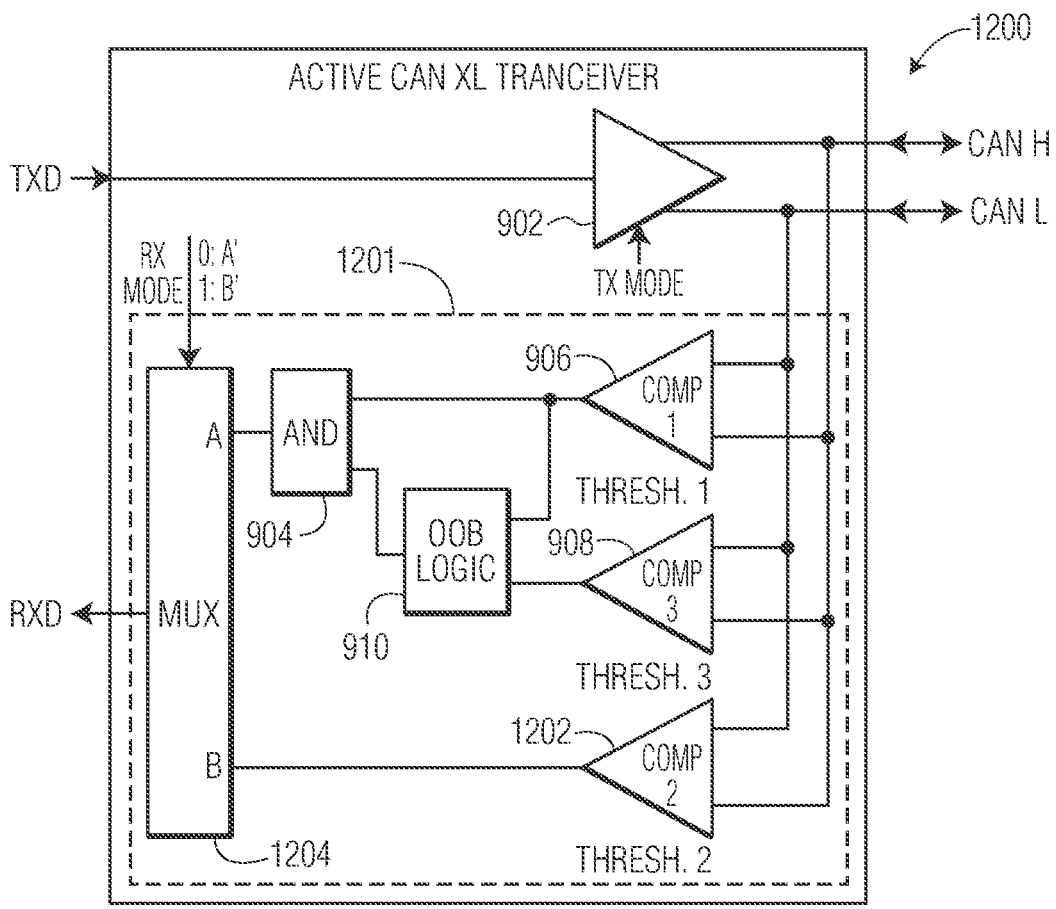
FIG. 12 shows an example of an active CAN XL transceiver configured with the out-of-bounds logic of FIG. 10.

Referring to FIGS. 9 and 10, FIG. 10 shows an example of out-of-bounds (OOB) logic 910 that can be used in CAN transceivers 900, 1200 of FIGS. 9 and 12. OOB logic 910 includes armed logic circuit 1002 and multiplexer 1004. Armed logic circuit 1002 includes a first input that receives the output of comparator 906, shown as signal COMP1, and a second input that receives the output of comparator 908, shown as signal COMP3. Multiplexer 1004 includes a control input coupled to an armed state signal output by armed logic circuit 1002, a first inverting input coupled to the signal COMP3, and a second input coupled to input that always has the value of "1". When the armed state is asserted, the complement of signal COMP3 is output by multiplexer 1004. When the armed state is not asserted, the output of multiplexer 1004 is set to a value of "1". The output of multiplexer 1004 is provided to the second input of AND gate 904. The output of AND gate 904 will be "0" unless both inputs are set to "1".

Figure 11:
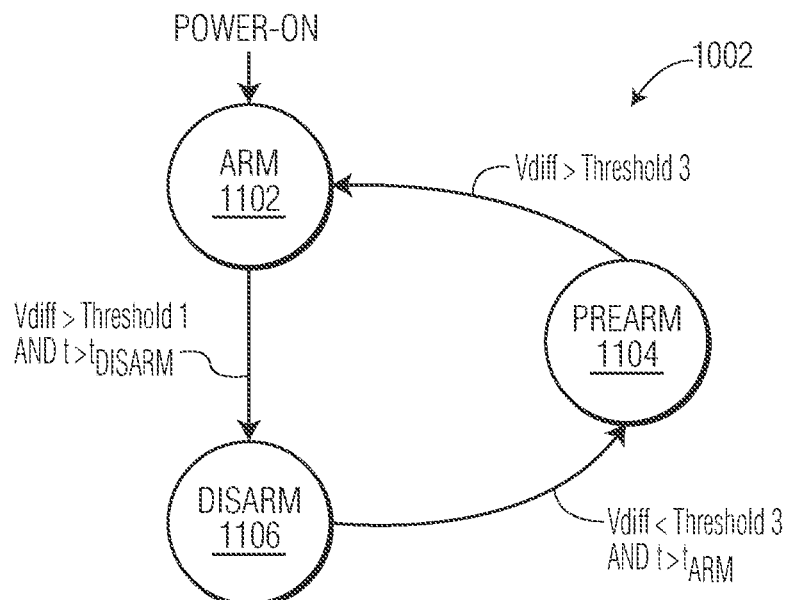
FIG. 11 shows an embodiment of a state machine for armed logic that can be implemented in the OOB logic in FIGS. 9 and 10.

FIG. 11 shows an embodiment of a state machine for armed logic 1002 that can be implemented in OOB logic 910 of FIGS. 9 and 10. At power-on of a device in which OOB logic 910 is implemented, OOB logic 910 enters ARM state 1102 and an ARMED signal is asserted. Armed logic 1002 deasserts the ARMED signal, which disables OOB logic 910, when the differential voltage, i.e., the difference between CANH and CAN L, is greater than the first threshold voltage (dominant state) for a time duration greater than a preselected time period, shown as TDISARM. The time period selected for TDISARM is sufficient to detect a reliable transition from recessive to dominant in the passive CAN XL transceiver 900. OOB logic 910 remains in the disarmed state until the criteria for transitioning to prearm state 1104 is met, which includes the differential voltage being less than the third threshold voltage for a time duration greater than another preselected time period shown as TARM. OOB logic 1002 remains in the prearm state 1104 until the criteria for transitioning to arm state 1102 is met, which includes the differential voltage being greater than the third threshold voltage.

The time periods TDISARM and TARM can be chosen such that the requirement for the minimum RXD low pulse during CAN XL traffic is fulfilled (e.g., TDISARM=TARM=15 ns). Other implementations are possible in which TDISARM can be longer compared to TARM for example to only disable the OOB logic 1002 during dominant pulse (e.g., CAN FD 8 Mbit/s→tbit=125 ns→T-DISARM=<125 ns).

FIG. 12 shows an example of an active CAN XL transceiver 1200 configured with OOB logic 910 of FIG. 10. Active CAN XL transceiver 1200 includes transmitter 902, and receiver arrangement 1201 that includes comparators 906, 908, 1202, OOB logic 910, AND logic gate 904, and multiplexer 1204. The term "active CAN XL transceiver" can refer to a transceiver that operates with the CAN XL protocol and voltage thresholds, and is backward compatible with the CAN FD protocol. Active CAN XL transceiver 1200 is able to decipher data in the CAN FD protocol. Receiver arrangement 1201 is configured to provide a digital output signal to the receive output 204 based on the differential signals (CANH/CANL). In one or more examples, the transceiver 1200 further comprises a TXD pin 203 for coupling to CAN controller 201 and to receive a single-ended transmit signal therefrom. The CAN transceiver 1200 further comprises a transmitter 902 coupled to the transmit input 203 to receive the transmit signal and, based on the input transmit signal, outputs differential analog signals CAN H and CAN L that are coupled to the to the CAN bus 105 (FIG. 1).

OOB logic 910 and AND gate 904 can be used to avoid problems due to reflections in CAN FD signals. Comparator 906 may be configured to determine a digital output signal using the CAN FD voltage level scheme with a threshold voltage of +0.5V to +0.9V. Comparator 908 may be configured to determine a digital output signal using the CAN XL voltage level scheme with a threshold voltage of –0.25V to –0.45V. Comparator 1202 may be configured to determine a digital output signal using the CAN XL voltage level scheme with a threshold voltage level related to a FAST mode of the CAN XL standard (CiA610-3), which is shown as threshold voltage of –0.1V to +0.1V. The term "FAST mode" refers to the relatively higher data rates that are achieved with the CAN XL protocol compared to operation using the CAN FD protocol, which is referred to as a "SLOW mode."

Multiplexer 1204 includes a first input (A) coupled to the output of AND logic gate 904, a second input (B) coupled to the output of comparator 1202 and an output coupled to the RXD pin 204. During a SLOW mode (Rx Mode logic "0") of operation corresponding to CAN FD operation, the RXD pin 204 is coupled to the output of AND logic gate 904 through multiplexer 1204. During the FAST mode (Rx Mode logic "1") of operation corresponding to CAN XL data phase operation, the RXD pin is coupled to the output of comparator 1202 through multiplexer 1204.

Figure 13:
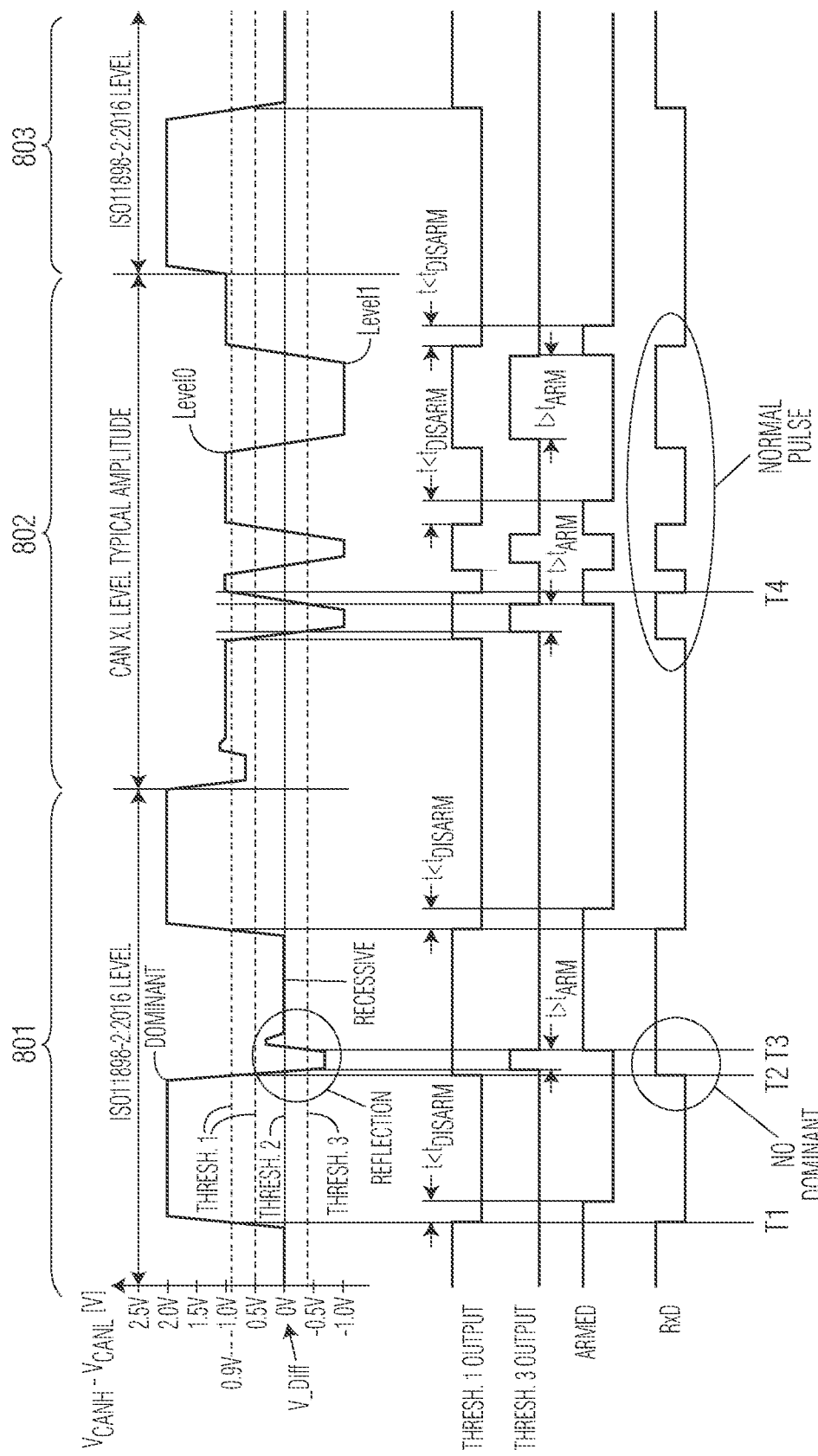
FIG. 13 shows a second example of a differential signal obtained from CAN bus signalling according to CAN FD which switches to CAN XL and back to CAN FD.

FIG. 13 shows a second example of a differential signal obtained from CAN bus signalling according to CAN FD during time segment 801, which switches to CAN XL during time segment 802, and back to CAN FD during time segment 803. The example uses typical voltages above 0.9V for level0 and below –0.9V for level1 voltage. During segment 801, during the recessive to dominant transition (time T1) on the bus, voltage crosses threshold 1 and, after time TDISARM, the ARMED signal goes low and disables OOB logic 910. After the dominant to recessive transition (time T2), the bus voltage crosses threshold 3 due to a reflection on the bus. Since the OOB logic 910 was disabled (ARMED=low), the RXD pin will not be driven low, highlighted in FIG. 13 as "No dominant glitch". When the bus voltage rises again and crosses threshold 3 at time T3, the ARMED signal goes high and the OOB logic 910 is enabled with the bus signal being below threshold 3 for a minimum duration of time TARM.

During the FAST mode in time segment 802, typical level0/level1 voltage amplitude is used on the bus. The typical or high signal amplitudes are shown with the level0 amplitude always above threshold 1. If the duration of the level0 signal results in a low level of comparator 1 for at least time TDISARM, the OOB logic 910 is disabled again before the level1 voltage is below threshold 3, preventing the level1 signal from driving the RXD pin low.

Figure 14:
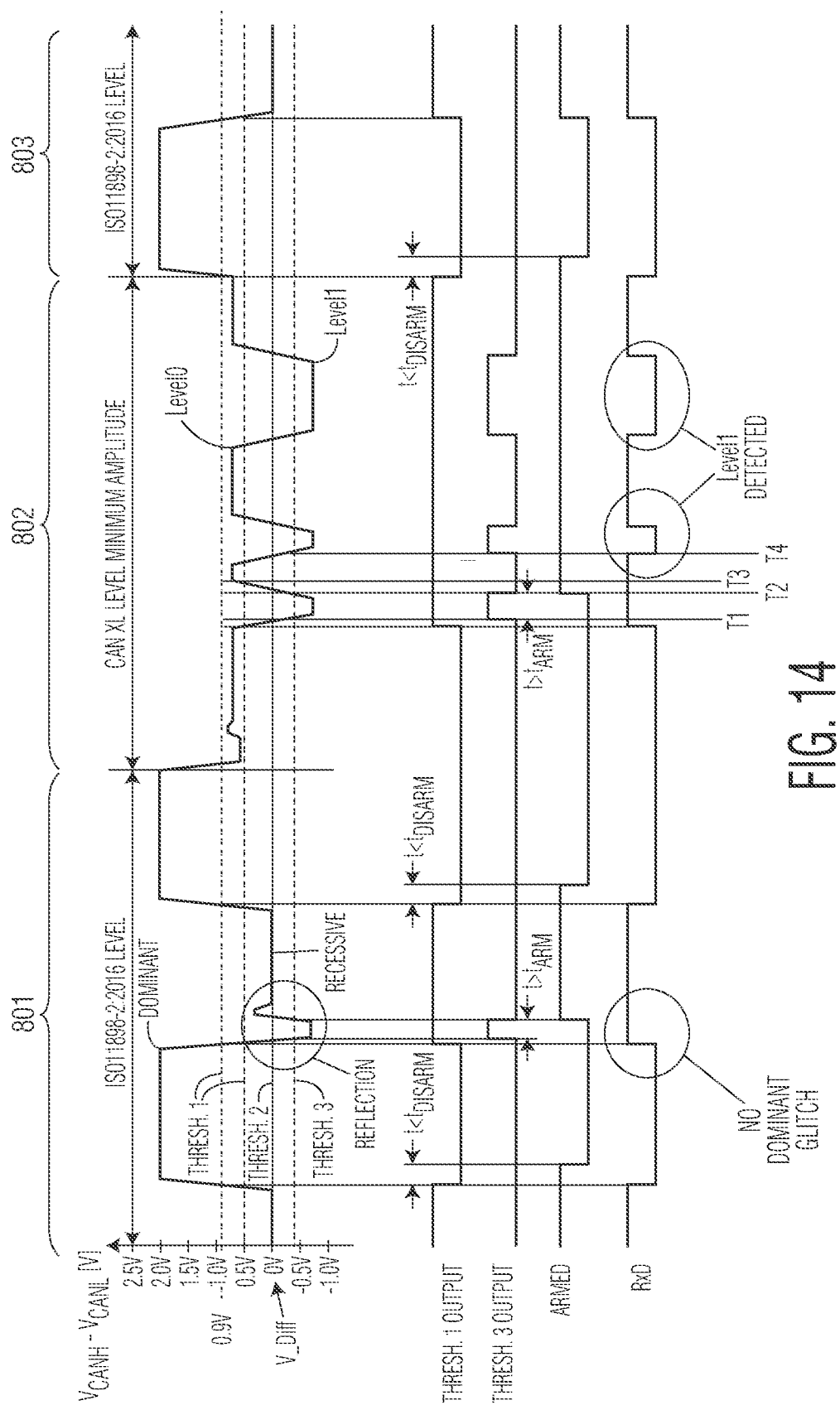
FIG. 14 shows a third example of a differential signal obtained from CAN bus signalling according to CAN FD which switches to CAN XL and back to CAN FD.

FIG. 14 shows a third example of a differential signal obtained from CAN bus signalling according to CAN FD which switches to CAN XL and back to CAN FD. During the FAST mode in time segment 802, minimum level0/level1 voltage amplitudes are used on the bus with the consequence that the level0 amplitude is always below threshold 1.

During the FAST mode (time segment 802), the level0 voltage on the bus stays below rising level of threshold 1 at time T3 and OOB logic 910 stays enabled. When level1 voltage is below threshold 3 at time T4, the RXD pin is driven low, signalling bus activity to CAN controller 201. The first level1 bit at time T1 will not result in a low on the RXD pin because OOB logic 910 is still disabled by the previous recessive to dominant transition. No problem arises because after the first level1 to level0 transition, OOB logic 910 is enabled again at time T2 and the second level1 bit will detected and drive the RXD pin low. In a worst case, the CAN XL traffic is 12 level0 bits, 12 level1 bits, 12 level0 bits due to stuffing rules during the FAST mode, which is 11 bits including the previous stuff bit equals 12 bits. OOB logic 910 is enabled after 24 bits at the latest, and the RXD pin is driven low after 36 bits. Typically, CAN controller 201 reliably detects activity after 36 FAST bits+15 ns. The requirement for bus idle during protocol exception state is 11 SLOW bits. The maximum arbitration speed is 1 Mbit/s resulting in minimum SLOW bit of 1 us. In a minimum FAST speed of 36 bits over 11 us-15 ns, the baud rate calculates as 3.2 Mbit/s. Since the FAST mode for CAN XL is only used for speeds above 5 Mbit/s, it is not a problem to miss the first level1 signal.

By now it can be appreciated that in selected embodiments a Controller Area Network (CAN) transceiver can comprise a receiver configured to determine a voltage differential signal (Vdiff) from analog signalling received from a CAN bus and configured to provide a digital output signal at a receiver output to a CAN controller based on the voltage differential signal. The receiver can comprise arming circuitry (armed logic of OOB logic 1210) configured to place the receiver in an armed state or an unarmed state based on the voltage differential signal, a first threshold corresponding to a first defined voltage level scheme of a first CAN protocol (thresh 1—CAN FD levels), and a second threshold (thresh 3—CAN XL levels) corresponding to a second defined voltage level scheme of a second CAN protocol, different from the first CAN protocol. The receiver can be configured such that when the receiver is in the unarmed state, a first digital signal indicative of activity on the CAN bus (RxD or input A of MUX 1304) can be provided based on a comparison between the voltage differential signal and the first threshold (e.g. a comparison using cmp1), and when the receiver is in the armed state, the first digital signal (RxD or input A of MUX 1304) can be provided based on comparisons between the voltage differential signal and each of the first threshold and the second threshold (e.g. comparisons using cmp1 and cmp3).

In another aspect, when the receiver is in the unarmed state, the first digital signal can be driven high when the voltage differential signal is less than the first threshold and driven low otherwise. (For example, when arm=0, Rx=cmp1 in which cmp1=1 when Vdiff<thresh1).

In another aspect, when the receiver is in the armed state, the first digital signal is driven high when the voltage differential signal is both less than the first threshold and greater than the second threshold and is driven low otherwise. (when arm=1, Rx=cmp1 AND NOT cmp3)

In another aspect, the arming circuitry is configured to place the receiver in the unarmed state during a dominant state of the voltage differential signal in the first CAN protocol, and after a transition of the voltage differential signal from the dominant state to a recessive state in the first CAN protocol, the arming circuitry is configured to not place the receiver in the armed state until after the voltage differential signal goes below than the second threshold for at least a threshold amount of time. (after a dominant to recessive transition, can't arm until after the first negative reflection)

In another aspect, the arming circuitry is configured to place the receiver in the armed state from the unarmed state when the voltage differential signal is less than the second threshold for at least a first threshold amount of time (tarm) and the voltage differential signal subsequently rises above the second threshold.

In another aspect, the arming circuitry is configured to place the receiver in the unarmed state from the armed state when the voltage differential signal is greater than the first threshold for at least a second threshold amount of time (tdisarm).

In another aspect, analog signalling received from the CAN bus is capable of operating in accordance with the first defined voltage level schemed of the first CAN protocol (CAN FD) or the second defined voltage level scheme for the second CAN protocol (CAN XL), and the voltage differential signal corresponds to a voltage on a first wire of the CAN bus minus a voltage on a second wire of the CAN bus (CANH_CANL), wherein:

the first threshold (e.g. 0.5-0.9V) is set to a positive value that is between a differential voltage level for a logic high bit in accordance with the first CAN protocol and a differential voltage level of for a logic low bit in accordance with the first CAN protocol; and the second threshold (e.g. −0.4V) is set to a negative value which corresponds to an activity-voltage threshold in accordance with the second CAN protocol.

In another aspect, the negative value for the activity-voltage threshold is between a predetermined lower receiver threshold used for detecting signalling for the second CAN protocol and a maximum lower voltage in accordance with the second CAN protocol.

In another aspect, the receiver is further configured to compare the voltage differential signal to a third threshold (thresh 2), in which the third threshold is set to a value which differentiates between a logic low bit and logic high bit in accordance with the second CAN protocol, wherein the first threshold is greater than the third threshold, and the third threshold is greater than the second threshold.

In another aspect, the receiver is capable of operating in a first mode (slow mode) and a second mode (fast mode) in which when the receiver is operating in the first mode, the digital output signal at the receiver output is generated from the first digital signal, and when the receiver is operating in the second mode, the digital output signal at the receiver output is generated based on the comparison between the voltage differential signal and the third threshold.

In another aspect, the CAN transceiver can further comprise a transmitter configured to receive a transmit signal from the CAN controller and provide analog signalling on the CAN bus based on the transmit signal. In a first mode of operation, the transmitter can provide the analog signalling according to the first CAN protocol, and in a second mode of operation, the transmitter can provide the analog signalling according to the second CAN protocol.

In other selected embodiments, a Controller Area Network (CAN) transceiver can comprise a receiver configured to determine a voltage differential signal (Vdiff) from analog signalling received from a CAN bus and configured to provide a digital output signal at a receiver output to a CAN controller based on the voltage differential signal. The receiver can comprise arming circuitry (armed logic of OOB logic 1210) configured to place the receiver in an unarmed state from an armed state when the voltage differential signal is greater than a first threshold (Thresh 1) for at least a first threshold amount of time (tdisarm), and place the receiver in the armed state from the unarmed state when the voltage differential signal is less than a second threshold for at least a second threshold amount of time (tarm) and the voltage differential signal subsequently rises above the second threshold. The second threshold can be less than the first threshold. When the receiver is in the unarmed state, a first digital signal (RxD or input A of MUX 1304) indicative of activity on the CAN bus can be provided based on a comparison between the voltage differential signal and the first threshold, and when the receiver is in the armed state, the first digital signal can be provided based on both the comparison between the voltage differential signal and the first threshold and a comparison between the voltage differential signal and the second threshold. The digital output signal can be selectively generated from the first digital signal.

In another aspect, analog signalling received from the CAN bus can be capable of operating in accordance with either a first defined level scheme (CAN FD) or a second defined level scheme (CAN XL), different from the first defined level scheme.

In another aspect, the voltage differential signal can correspond to a voltage on a first wire of the CAN bus minus a voltage on a second wire of the CAN bus (CANH_CANL). The first threshold (e.g. 0.5-0.9V) can be set to a positive value that is between a differential voltage level of a logic high bit in accordance with the first defined level scheme and a differential voltage level of a logic low bit in accordance with the first defined level scheme. The second threshold (e.g. −0.4V) can be set to a negative value that is between a predetermined lower receiver threshold used for detecting signalling for the second defined level scheme and a maximum lower voltage in accordance with the second defined level scheme.

In another aspect, the first digital signal can be driven to a logic level low only if the voltage differential signal is above the first threshold (cmp1=0) or both the receiver is armed and the voltage differential signal is less than the second threshold (output of OOB=0 b/c armed=1 and cmp3=1). Otherwise, the first digital signal can be a logic level high. (Operation of AND gate 1204).

In another aspect, the receiver can be capable of operating in a first mode (slow mode) and a second mode (fast mode) in which when the receiver is operating in the first mode, the first digital signal is provided as the digital output signal at the receiver output, and when the receiver is operating in the second mode, the digital output signal at the receiver output is generated based on a comparison between the voltage differential signal and a third threshold, wherein the third threshold is between the first threshold and the second threshold. (covers operation of MUX 1304)

In other selected embodiments, in a Controller Area Network (CAN) transceiver having a receiver configured to determine a voltage differential signal (Vdiff) from analog signalling received from a CAN bus and configured to provide a digital output signal at a receiver output to a CAN controller based on the voltage differential signal, a method can comprise providing a first comparison output based on a comparison between the voltage differential signal and a first threshold, providing a second comparison output based on a comparison between the voltage differential signal and a second threshold (thresh 3), wherein the second threshold is less than the first threshold, and selectively placing the receiver in an armed state in response to the first comparison output and the second comparison output. When the receiver is in an unarmed state, the first comparison output can be provided as a first digital signal (RxD or input A of MUX 1304). When the receiver is in the armed state, a logic combination (e.g. cmp1 AND NOT cmp3) of the first comparison output and the second comparison output can be provided as the first digital signal (RxD or input A of MUX 1304).

In another aspect, the selectively placing the receiver in the armed state in response to the first comparison output and the second comparison output can comprise placing the receiver in the armed state from the unarmed state when the voltage differential signal is less than the second threshold for at least a first threshold amount of time (tarm) and the voltage differential signal subsequently rises above the second threshold; and placing the receiver in the unarmed state from the armed state when the voltage differential signal is greater than the first threshold for at least a second threshold amount of time (tdisarm).

In another aspect, the analog signalling received from the CAN bus can be capable of operating in accordance with either a first defined level scheme (CAN FD) or a second defined level scheme (CAN XL), different from the first defined level scheme, and the receiver can be capable of operating in at least two modes (e.g. slow mode, fast mode). The method can further comprise providing a third comparison output (thresh 2 output) based on a comparison between the voltage differential signal and a third threshold (thresh 2), wherein the third threshold is between the second threshold and the first threshold, operating the receiver in the first mode in which the digital output signal at the receiver output is generated from the first digital signal, and operating the receiver in the second mode in which the digital output signal at the receiver output is generated from the third comparison output, independent of the first and second comparison outputs.

In another aspect, the voltage differential signal can correspond to a voltage on a first wire of the CAN bus minus a voltage on a second wire of the CAN bus (CANH_CANL). The first threshold (e.g. 0.5-0.9V) can be set to a positive value that is between a differential voltage level of a logic high bit in accordance with the first defined level scheme and a differential voltage level of a logic low bit in accordance with the first defined level scheme. The second threshold (e.g. −0.4V) can be set to a negative value that is between a predetermined lower receiver threshold used for detecting signalling for the second defined level scheme and a maximum lower voltage in accordance with the second defined level scheme.

The instructions and/or state diagram steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above can be implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, controller area network, local area network, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A Controller Area Network (CAN) transceiver comprising:
a receiver configured to determine a voltage differential signal from analog signalling received from a CAN bus and configured to provide a digital output signal at a receiver output to a CAN controller based on the voltage differential signal, the receiver comprising:
arming circuitry configured to place the receiver in an armed state or an unarmed state based on the voltage differential signal, a first threshold corresponding to a first defined voltage level scheme of a first CAN protocol, and a second threshold corresponding to a second defined voltage level scheme of a second CAN protocol, different from the first CAN protocol, wherein the receiver is configured such that:
when the receiver is in the unarmed state, a first digital signal indicative of activity on the CAN bus is provided based on a comparison between the voltage differential signal and the first threshold, and
when the receiver is in the armed state, the first digital signal is provided based on comparisons between the voltage differential signal and each of the first threshold and the second threshold,
wherein when the receiver is in the unarmed state, the first digital signal is driven high when the voltage differential signal is less than the first threshold and driven low otherwise.

2. The CAN transceiver of claim 1, wherein when the receiver is in the armed state, the first digital signal is driven high when the voltage differential signal is both less than the first threshold and greater than the second threshold and is driven low otherwise.

3. The CAN transceiver of claim 2, wherein the arming circuitry is configured to place the receiver in the unarmed state during a dominant state of the voltage differential signal in the first CAN protocol, and after a transition of the voltage differential signal from the dominant state to a recessive state in the first CAN protocol, the arming circuitry is configured to not place the receiver in the armed state until after the voltage differential signal goes below than the second threshold for at least a threshold amount of time.

4. A Controller Area Network (CAN) transceiver comprising:
a receiver configured to determine a voltage differential signal from analog signalling received from a CAN bus and configured to provide a digital output signal at a receiver output to a CAN controller based on the voltage differential signal, the receiver comprising:
arming circuitry configured to place the receiver in an armed state or an unarmed state based on the voltage differential signal, a first threshold corresponding to a first defined voltage level scheme of a first CAN protocol, and a second threshold corresponding to a second defined voltage level scheme of a second CAN protocol, different from the first CAN protocol, wherein the receiver is configured such that:
when the receiver is in the unarmed state, a first digital signal indicative of activity on the CAN bus is provided based on a comparison between the voltage differential signal and the first threshold, and
when the receiver is in the armed state, the first digital signal is provided based on comparisons between the voltage differential signal and each of the first threshold and the second threshold,
wherein the arming circuitry is configured to place the receiver in the armed state from the unarmed state when the voltage differential signal is less than the second threshold for at least a first threshold amount of time and the voltage differential signal subsequently rises above the second threshold.

5. The CAN transceiver of claim 4, wherein the arming circuitry is configured to place the receiver in the unarmed state from the armed state when the voltage differential signal is greater than the first threshold for at least a second threshold amount of time.

6. A Controller Area Network (CAN) transceiver comprising:
a receiver configured to determine a voltage differential signal from analog signalling received from a CAN bus and configured to provide a digital output signal at a receiver output to a CAN controller based on the voltage differential signal, the receiver comprising:
arming circuitry configured to place the receiver in an armed state or an unarmed state based on the voltage differential signal, a first threshold corresponding to a first defined voltage level scheme of a first CAN protocol, and a second threshold corresponding to a second defined voltage level scheme of a second CAN protocol, different from the first CAN protocol, wherein the receiver is configured such that:
when the receiver is in the unarmed state, a first digital signal indicative of activity on the CAN bus is provided based on a comparison between the voltage differential signal and the first threshold, and
when the receiver is in the armed state, the first digital signal is provided based on comparisons between the voltage differential signal and each of the first threshold and the second threshold,
wherein analog signalling received from the CAN bus is capable of operating in accordance with the first defined voltage level schemed of the first CAN protocol or the second defined voltage level scheme for the second CAN protocol, and the voltage differential signal corresponds to a voltage on a first wire of the CAN bus minus a voltage on a second wire of the CAN bus, wherein:

the first threshold is set to a positive value that is between a differential voltage level for a logic high bit in accordance with the first CAN protocol and a differential voltage level of for a logic low bit in accordance with the first CAN protocol; and the second threshold is set to a negative value which corresponds to an activity-voltage threshold in accordance with the second CAN protocol.

7. The CAN transceiver of claim 6, wherein the negative value for the activity-voltage threshold is between a predetermined lower receiver threshold used for detecting signalling for the second CAN protocol and a maximum lower voltage in accordance with the second CAN protocol.

8. The CAN transceiver of claim 6, wherein the receiver is further configured to compare the voltage differential signal to a third threshold, in which the third threshold is set to a value which differentiates between a logic low bit and logic high bit in accordance with the second CAN protocol, wherein the first threshold is greater than the third threshold, and the third threshold is greater than the second threshold.

9. The CAN transceiver of claim 8, wherein the receiver is capable of operating in a first mode and a second mode (fast mode) in which when the receiver is operating in the first mode, the digital output signal at the receiver output is generated from the first digital signal, and when the receiver is operating in the second mode, the digital output signal at the receiver output is generated based on the comparison between the voltage differential signal and the third threshold.

10. The CAN transceiver of claim 8, further comprising:
a transmitter configured to receive a transmit signal from the CAN controller and provide analog signalling on the CAN bus based on the transmit signal, wherein in a first mode of operation, the transmitter provides the analog signalling according to the first CAN protocol, and in a second mode of operation, the transmitter provides the analog signalling according to the second CAN protocol.

11. A Controller Area Network (CAN) transceiver comprising:
a receiver configured to determine a voltage differential signal from analog signalling received from a CAN bus and configured to provide a digital output signal at a receiver output to a CAN controller based on the voltage differential signal, the receiver comprising:
arming circuitry configured to:
place the receiver in an unarmed state from an armed state when the voltage differential signal is greater than a first threshold for at least a first threshold amount of time, and
place the receiver in the armed state from the unarmed state when the voltage differential signal is less than a second threshold for at least a second threshold amount of time and the voltage differential signal subsequently rises above the second threshold, wherein the second threshold is less than the first threshold;
wherein when the receiver is in the unarmed state, a first digital signal indicative of activity on the CAN bus is provided based on a comparison between the voltage differential signal and the first threshold, and when the receiver is in the armed state, the first digital signal is provided based on both the comparison between the voltage differential signal and the first threshold and a comparison between the voltage differential signal and the second threshold, wherein the digital output signal is selectively generated from the first digital signal, and
wherein analog signalling received from the CAN bus is capable of operating in accordance with either a first defined level scheme or a second defined level scheme, different from the first defined level scheme.

12. The CAN transceiver of claim 11, wherein the voltage differential signal corresponds to a voltage on a first wire of the CAN bus minus a voltage on a second wire of the CAN bus, wherein:
the first threshold is set to a positive value that is between a differential voltage level of a logic high bit in accordance with the first defined level scheme and a differential voltage level of a logic low bit in accordance with the first defined level scheme; and
the second threshold is set to a negative value that is between a predetermined lower receiver threshold used for detecting signalling for the second defined level scheme and a maximum lower voltage in accordance with the second defined level scheme.

13. A Controller Area Network (CAN) transceiver comprising:
a receiver configured to determine a voltage differential signal from analog signalling received from a CAN bus and configured to provide a digital output signal at a receiver output to a CAN controller based on the voltage differential signal, the receiver comprising:
arming circuitry configured to:
place the receiver in an unarmed state from an armed state when the voltage differential signal is greater than a first threshold for at least a first threshold amount of time, and
place the receiver in the armed state from the unarmed state when the voltage differential signal is less than a second threshold for at least a second threshold amount of time and the voltage differential signal subsequently rises above the second threshold, wherein the second threshold is less than the first threshold;
wherein when the receiver is in the unarmed state, a first digital signal indicative of activity on the CAN bus is provided based on a comparison between the voltage differential signal and the first threshold, and when the receiver is in the armed state, the first digital signal is provided based on both the comparison between the voltage differential signal and the first threshold and a comparison between the voltage differential signal and the second threshold, wherein the digital output signal is selectively generated from the first digital signal, and
wherein the first digital signal is driven to a logic level low only if:
the voltage differential signal is above the first threshold or both the receiver is armed and the voltage differential signal is less than the second threshold,
else the first digital signal is a logic level high.

14. A Controller Area Network (CAN) transceiver comprising:
a receiver configured to determine a voltage differential signal from analog signalling received from a CAN bus and configured to provide a digital output signal at a receiver output to a CAN controller based on the voltage differential signal, the receiver comprising:
arming circuitry configured to:

place the receiver in an unarmed state from an armed state when the voltage differential signal is greater than a first threshold for at least a first threshold amount of time, and place the receiver in the armed state from the unarmed state when the voltage differential signal is less than a second threshold for at least a second threshold amount of time and the voltage differential signal subsequently rises above the second threshold, wherein the second threshold is less than the first threshold;

wherein when the receiver is in the unarmed state, a first digital signal indicative of activity on the CAN bus is provided based on a comparison between the voltage differential signal and the first threshold, and when the receiver is in the armed state, the first digital signal is provided based on both the comparison between the voltage differential signal and the first threshold and a comparison between the voltage differential signal and the second threshold, wherein the digital output signal is selectively generated from the first digital signal, and wherein the receiver is capable of operating in a first mode and a second mode in which when the receiver is operating in the first mode, the first digital signal is provided as the digital output signal at the receiver output, and when the receiver is operating in the second mode, the digital output signal at the receiver output is generated based on a comparison between the voltage differential signal and a third threshold, wherein the third threshold is between the first threshold and the second threshold.

15. In a Controller Area Network (CAN) transceiver having a receiver configured to determine a voltage differential signal from analog signalling received from a CAN bus and configured to provide a digital output signal at a receiver output to a CAN controller based on the voltage differential signal, a method comprising:

providing a first comparison output based on a comparison between the voltage differential signal and a first threshold;

providing a second comparison output based on a comparison between the voltage differential signal and a second threshold, wherein the second threshold is less than the first threshold;

selectively placing the receiver in an armed state in response to the first comparison output and the second comparison output;

when the receiver is in an unarmed state, providing the first comparison output as a first digital signal; and when the receiver is in the armed state, providing a logic combination of the first comparison output and the second comparison output as the first digital signal, wherein the selectively placing the receiver in the armed state in response to the first comparison output and the second comparison output comprises:

placing the receiver in the armed state from the unarmed state when the voltage differential signal is less than the second threshold for at least a first threshold amount of time and the voltage differential signal subsequently rises above the second threshold; and placing the receiver in the unarmed state from the armed state when the voltage differential signal is greater than the first threshold for at least a second threshold amount of time.

16. In a Controller Area Network (CAN) transceiver having a receiver configured to determine a voltage differential signal from analog signalling received from a CAN bus and configured to provide a digital output signal at a receiver output to a CAN controller based on the voltage differential signal, a method comprising:

providing a first comparison output based on a comparison between the voltage differential signal and a first threshold;

providing a second comparison output based on a comparison between the voltage differential signal and a second threshold, wherein the second threshold is less than the first threshold;

selectively placing the receiver in an armed state in response to the first comparison output and the second comparison output;

when the receiver is in an unarmed state, providing the first comparison output as a first digital signal; and when the receiver is in the armed state, providing a logic combination of the first comparison output and the second comparison output as the first digital signal, wherein the analog signalling received from the CAN bus is capable of operating in accordance with either a first defined level scheme or a second defined level scheme, different from the first defined level scheme, and the receiver is capable of operating in at least two modes, the method further comprising:

providing a third comparison output based on a comparison between the voltage differential signal and a third threshold, wherein the third threshold is between the second threshold and the first threshold;

operating the receiver in the first mode in which the digital output signal at the receiver output is generated from the first digital signal; and operating the receiver in the second mode in which the digital output signal at the receiver output is generated from the third comparison output, independent of the first and second comparison outputs.

17. The method of claim 16, wherein the voltage differential signal corresponds to a voltage on a first wire of the CAN bus minus a voltage on a second wire of the CAN bus, wherein:

the first threshold is set to a positive value that is between a differential voltage level of a logic high bit in accordance with the first defined level scheme and a differential voltage level of a logic low bit in accordance with the first defined level scheme; and the second threshold is set to a negative value that is between a predetermined lower receiver threshold used for detecting signalling for the second defined level scheme and a maximum lower voltage in accordance with the second defined level scheme.

\* \* \* \* \*